(12) United States Patent
Huang

(10) Patent No.: US 10,344,182 B2
(45) Date of Patent: Jul. 9, 2019

(54) POLYIMIDE SUBSTRATE AND METHOD FOR PREPARING THE SAME, AND FLEXIBLE DISPLAY

(71) Applicant: BOE TECHNOLOGY GROUP CO., LTD., Beijing (CN)

(72) Inventor: Hua Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 276 days.

(21) Appl. No.: 15/131,469

(22) Filed: Apr. 18, 2016

(65) Prior Publication Data

US 2017/0088747 A1 Mar. 30, 2017

(30) Foreign Application Priority Data

Sep. 25, 2015 (CN) .......................... 2015 1 0621996

(51) Int. Cl.
*B29C 41/02* (2006.01)
*C09D 179/08* (2006.01)
(Continued)

(52) U.S. Cl.
CPC ............ *C09D 179/08* (2013.01); *B29C 41/02* (2013.01); *B29C 41/50* (2013.01); *C03C 17/32* (2013.01);
(Continued)

(58) Field of Classification Search
CPC ............. C09D 179/08; C09D 197/005; C09D 133/24; C03C 17/32; C08G 73/1003;
(Continued)

(56) References Cited

U.S. PATENT DOCUMENTS

| | | | | |
|---|---|---|---|---|
| 4,271,288 A | * | 6/1981 | Woo ...................... | C08G 73/10 428/446 |
| 2010/0305241 A1 | * | 12/2010 | Balakshin .............. | A61K 36/15 524/74 |

(Continued)

FOREIGN PATENT DOCUMENTS

| | | |
|---|---|---|
| CN | 101392059 A | 3/2009 |
| CN | 104167513 A | 11/2014 |

(Continued)

OTHER PUBLICATIONS

First Office Action regarding Chinese Application No. 201510621996.2, dated Sep. 11, 2017. Translation provided by Dragon Intellectual Property Law Firm.

*Primary Examiner* — Eli D. Strah
(74) *Attorney, Agent, or Firm* — Michael Malinzak

(57) ABSTRACT

The present invention relates to the field of displays and discloses a polyimide substrate, which is manufactured by reacting lignin, polyimide and a free radical initiator. Because lignin contains various active groups, for example, hydroxyl, carboxyl and aryl, etc., when it is introduced into the polymer structure of polyimide, the maximum absorption peak of the polymer can be made to redshift from less than or equal to 280 nm to less than or equal to 380 nm, so that a certain absorption and screening action may be laid on the light wave during a subsequent Laser Lift Off process, and the substrate and the liquid crystal may be prevented from being damaged during a Laser Lift Off process of the glass base substrate, thereby guaranteeing the display quality of the flexible display.

20 Claims, 1 Drawing Sheet

(51) Int. Cl.
*B29C 41/50* (2006.01)
*C08G 73/10* (2006.01)
*C08J 5/18* (2006.01)
*C03C 17/32* (2006.01)
*C09D 197/00* (2006.01)
*B32B 27/28* (2006.01)
*C09D 133/24* (2006.01)
*C07G 1/00* (2011.01)
*C08H 7/00* (2011.01)
*B29K 79/00* (2006.01)
*B29K 105/00* (2006.01)
*B29L 31/34* (2006.01)

(52) U.S. Cl.
CPC ......... *C08G 73/10* (2013.01); *C08G 73/1003* (2013.01); *C08J 5/18* (2013.01); *C09D 197/005* (2013.01); *B29K 2079/08* (2013.01); *B29K 2105/0044* (2013.01); *B29K 2105/0058* (2013.01); *B29L 2031/3475* (2013.01); *B32B 27/281* (2013.01); *B32B 2379/08* (2013.01); *B32B 2457/20* (2013.01); *C07G 1/00* (2013.01); *C08H 6/00* (2013.01); *C08J 2379/08* (2013.01); *C09D 133/24* (2013.01)

(58) Field of Classification Search
CPC ......... C08G 73/10; B29C 41/50; B29C 41/02; C08J 5/18; C08J 2379/08; B32B 2457/20; B32B 2379/08; B32B 27/281; B29K 2105/0058; B29K 2105/0044; B29K 2079/08; B29L 2031/3475; C08H 6/00; C07G 1/00
See application file for complete search history.

(56) References Cited

U.S. PATENT DOCUMENTS

2013/0327253 A1    12/2013  Matsuno et al.
2016/0002407 A1*  1/2016  Wakita ................ C08G 73/106
                                                            257/40
2016/0181554 A1    6/2016  Liu et al.

FOREIGN PATENT DOCUMENTS

CN         104804189 A      7/2015
EP          0144661 A2 *   6/1985  ........... H01L 21/312
WO   WO-2014207963 A1 *  12/2014  ........... C08G 73/106

* cited by examiner

POLYIMIDE SUBSTRATE AND METHOD FOR PREPARING THE SAME, AND FLEXIBLE DISPLAY

CROSS-REFERENCE TO RELATED APPLICATION

The present application claims priority to and incorporates by reference the entire contents of Chinese priority document 201510621996.2, filed in China on Sep. 25, 2015.

TECHNICAL FIELD

The present invention relates to the field of displays, and in particular, to a polyimide substrate and a method for preparing the same, and a flexible display.

BACKGROUND

Flexible display is referred to as bendable display or soft display. It is made of a soft material, and its main structure includes a flexible substrate, an intermediate display medium and a package.

The flexible substrate is an important component part of the whole flexible display, and its performance has an important influence on both the quality and lifetime of the flexible display. At present, materials that may be used for a flexible substrate include ultrathin glass, a metal foil or a polymer film. The polymer film may be polyethyleneterephthalate, polyethylenenaphthalate, polycarbonate, cyclic polyolefin, polyethersulfone and polyimide, etc. Due to its excellent high temperature resistance, good mechanical property and excellent chemical stability, polyimide substrate attracts much attention.

For a polyimide substrate, a piece of glass is taken as the base substrate, and a polyimide solution, or a solution of its precursor, polyamic acid, is coated on the glass base substrate; then, a polyimide film is obtained after curing; next, a display medium, a water and oxygen shielding layer and a package layer are assembled on the surface of the polyimide film; and finally, the glass base substrate is removed from the device prepared via a Laser Lift Off (LLO) process, thereby a display that takes a polyimide film as a flexible substrate is obtained.

However, because polyimide substrate does not have the function of laser screening, during the process of sealing and curing or removing the glass base substrate via a Laser Lift Off process, laser tends to directly influence the liquid crystals inside the display panel, thus the display quality may be influenced.

SUMMARY

The present invention provides a polyimide substrate and a method for preparing the same, and a flexible display. The polyimide substrate may absorb the lights with wavelengths ≤380 nm, thus it may be effectively prevented that the substrate and the liquid crystals inside the panel are damaged during the LLO process, thereby the quality of the flexible display may be guaranteed.

The invention discloses a method for preparing a polyimide substrate, which includes the steps of: dissolving lignin, polyimide and a free radical polymerization initiator in an organic solvent; and coating the solution obtained after dissolution on a glass substrate, and obtaining a polyimide substrate by reacting in a nitrogen gas atmosphere.

Optionally, a mass ratio of lignin, polyimide and the free radical polymerization initiator is 100:300-1000:2.

Optionally, the organic solvent is N-methylpyrrolidone (NMP), tetrahydrofuran or toluene.

Optionally, the free radical polymerization initiator is benzoyl peroxide, t-butyl peroxybenzoate or methylethyl ketone peroxide.

Optionally, the reaction is conducted at a temperature of 200-400° C.

Optionally, the reaction is maintained for 6-24 hours.

The invention discloses a polyimide substrate, which is manufactured by reacting lignin, polyimide and a free radical initiator.

Optionally, a mass ratio of lignin, polyimide and the free radical polymerization initiator is 100:300-1000:2.

The invention further discloses a flexible display, which includes the polyimide substrate according to the above technical solutions or a polyimide substrate prepared by the method according to the above technical solutions.

In comparison with the prior art, the polyimide substrate of the invention is manufactured by lignin, polyimide and a free radical initiator. Because lignin contains various active groups, for example, hydroxyl, carboxyl and aryl, etc., when it is introduced into the polymer structure of polyimide, the maximum absorption peak of the polymer can be made to redshift from less than or equal to 280 nm to less than or equal to 380 nm, so that a certain absorption and screening action may be laid on the light wave during a subsequent Laser Lift Off process, and the substrate and the liquid crystal may be prevented from being damaged during a Laser Lift Off process of the glass base substrate, thereby guaranteeing the display quality of the flexible display. Additionally, the polyimide substrate of the invention also has high transparency and excellent thermal stability.

BRIEF DESCRIPTION

DETAILED DESCRIPTION

Figure 1:
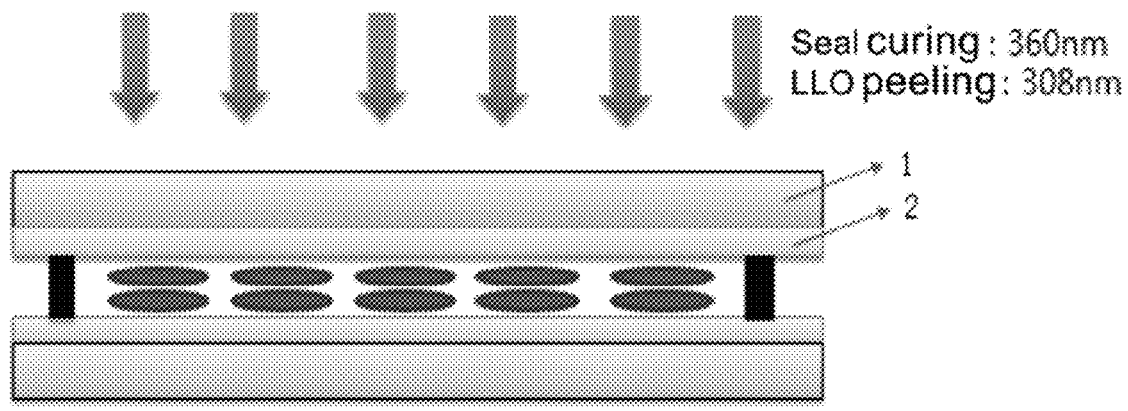
FIG. 1 shows a flexible display with a glass base substrate unpeeled; wherein, 1 represents a glass base substrate, and 2 represents a polyimide substrate.

For further understanding the invention, optional implementations of the invention will be described below in conjunction with the embodiments; however, it should be understood that these descriptions are only used for further illustrating the characteristics and advantages of the invention, rather than limiting the claims of the invention.

One embodiment of the invention discloses a method for preparing a polyimide substrate, which includes the steps of: dissolving lignin, polyimide and a free radical polymerization initiator in an organic solvent, coating the solution obtained on a glass substrate, and obtaining a polyimide substrate by reacting in a nitrogen gas atmosphere.

The lignin contains a large amount of active groups, for example, hydroxyl, carboxyl, carbonyl, aryl, etc., which may influence the absorption of ultraviolet light by lignin. In the invention, the maximum absorption peak of a polymer, which is formed by introducing lignin with such groups into polyimide, redshifts from less than or equal to 280 nm to less than or equal to 380 nm.

During the preparation of a flexible display, the wavelength for sealing and curing is about 360 nm, and the wavelength for the LLO process is about 308 nm. In the invention, the maximum absorption peak of the polyimide substrate into which lignin is introduced may reach 380 nm, thus the light waves during sealing and curing or the LLO process may be totally absorbed, thereby the damage of the light waves on the substrate and the liquid crystals may be avoided.

According to one embodiment of the invention, lignin, polyimide and a free radical polymerization initiator are dissolved in an organic solvent, the solution obtained is coated on a glass substrate, and a polyimide substrate is obtained by reacting in a nitrogen gas atmosphere. A mass ratio of lignin, polyimide and the free radical polymerization initiator may be 100:300-1000:2, or it may be 100:400-900:2, and it may also be 100:450-650:2.

The organic solvent may be NMP, tetrahydrofuran or toluene. The free radical polymerization initiator may be benzoyl peroxide, t-butyl peroxybenzoate or methylethyl ketone peroxide.

The reaction may be conducted at a temperature of 200-400° C., or at a temperature of 200-250° C.

The reaction may be maintained for 6-24 hours, or for 6-8 hours.

The invention further discloses a polyimide substrate, which is manufactured by reacting lignin, polyimide and a free radical initiator. A mass ratio of lignin, polyimide and the free radical polymerization initiator may be 100:300-1000:2, or it may be 100:400-900:2, and it may also be 100:450-650:2. The reaction may be conducted at a temperature of 200-400° C., or at a temperature of 200-250° C. The reaction may be maintained for 6-24 hours, or for 6-8 hours.

The invention further discloses a flexible display, which includes the polyimide substrate according to the above embodiments or a polyimide substrate prepared by the method according to the above embodiments. In the invention, the method for preparing a flexible display by a polyimide substrate is not specifically limited, and well-known methods to one skilled in the art may be employed.

For further understanding the invention, a polyimide substrate and a method for preparing the same and a flexible display device of the invention will be illustrated in detail below in conjunction with the embodiments, and the protection scope of the invention is not limited to the embodiments below.

The lignin employed in the invention is a commercially available product.

Embodiment 1

100 g lignin, 450 g polyimide and 2 g benzoyl peroxide are dissolved in NMP, and after a homogeneous solution is formed, the solution is coated on a glass base substrate by a coating equipment, and at the same time, a nitrogen gas is fed into the equipment to remove the oxygen gas, and it reacts for 6 hours at 200° C., thus a polyimide substrate is obtained.

Figure 2:
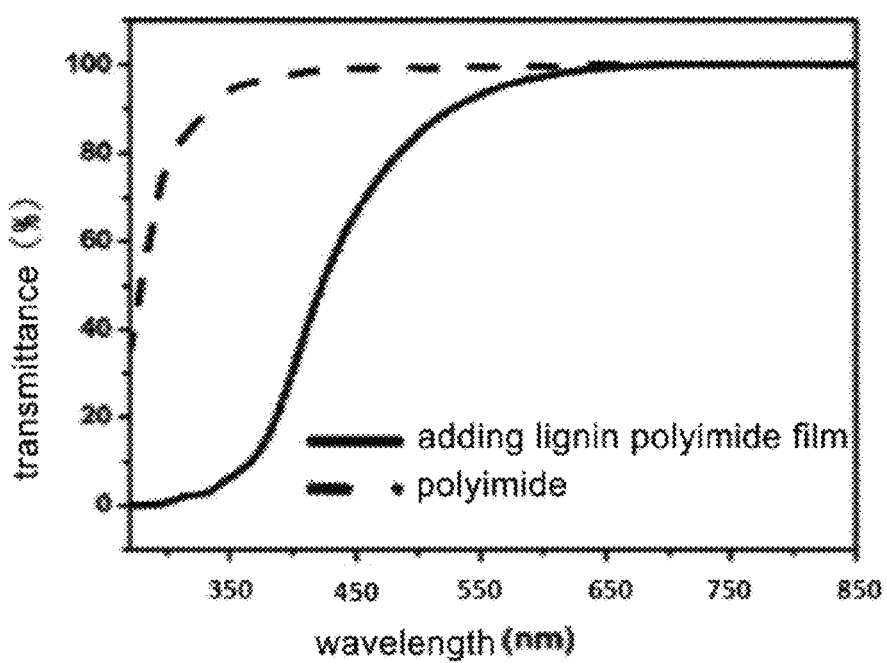
FIG. 2 shows the light transmittance of a polyimide substrate according to one embodiment of the invention.

The light absorption performance and the transparency of the polyimide substrate obtained are tested, and reference may be made to FIG. 2 for the test results. FIG. 2 shows the light transmittance of the polyimide substrate according to this embodiment. It may be known from FIG. 2 that, in comparison with an ordinary undoped polyimide substrate, the maximum absorption peak of the polyimide substrate according to this embodiment, which is modified by lignin, redshifts from less than or equal to 280 nm to less than or equal to 380 nm. Moreover, it has high transparency, and the transmittance may reach above 85% in the range of visible lights.

Embodiment 2

100 g lignin, 500 g polyimide and 2 g benzoyl peroxide are dissolved in tetrahydrofuran, and after a homogeneous solution is formed, the solution is coated on a glass base substrate by a coating equipment, and at the same time, a nitrogen gas is fed into the equipment to remove the oxygen gas, and it reacts for 8 hours at 250° C., thus a polyimide substrate is obtained.

The light absorption performance and the transparency of the polyimide substrate obtained are tested, and results similar to Embodiment 1 are obtained, that is, in comparison with an ordinary undoped polyimide substrate, the maximum absorption peak of the polyimide substrate according to this embodiment, which is modified by lignin, redshifts from less than or equal to 280 nm to less than or equal to 380 nm.

Embodiment 3

100 g lignin, 800 g polyimide and 2 g benzoyl peroxide are dissolved in toluene, and after a homogeneous solution is formed, the solution is coated on a glass base substrate by a coating equipment, and at the same time, a nitrogen gas is fed into the equipment to remove the oxygen gas, and it reacts for 24 hours at 300° C., thus a polyimide substrate is obtained.

The light absorption performance and the transparency of the polyimide substrate obtained are tested, and results similar to Embodiment 1 are obtained, that is, in comparison with an ordinary undoped polyimide substrate, the maximum absorption peak of the polyimide substrate according to this embodiment, which is modified by lignin, redshifts from less than or equal to 280 nm to less than or equal to 380 nm.

The above embodiments are only illustrated for aiding the understanding of the method of the invention and its core concept. It should be pointed out that, for one of ordinary skills in the art, various improvements and modifications may be made to the invention without departing from the principles of the invention, and these improvements and modifications also fall into the protection scope of the claims of the invention.

With the above illustration of the embodiments disclosed, those skilled in the art can implement or utilize the invention. Various modifications to these embodiments are apparent to those skilled in the art, and the general principle defined herein may be realized in other embodiments without departing from the spirit or scope of the invention. Therefore, the invention will not be limited to the embodiments illustrated; instead, the invention conforms to the widest range consistent with the principles and novel features disclosed herein.

What is claimed is:

1. A method for preparing a polyimide substrate, comprising the steps of:
   dissolving lignin, polyimide, and a free radical polymerization initiator in an organic solvent; and
   coating the solution obtained after dissolution on a glass substrate, and obtaining a polyimide substrate by reacting in a nitrogen gas atmosphere,
   wherein the polyimide substrate comprises active groups of hydroxyl, carboxyl, and aryl from the lignin such that the polyimide substrate has a maximum absorption peak that redshifts from less than or equal to 280 nm to less than or equal to 380 nm.

2. The preparation method according to claim 1, wherein, a mass ratio of lignin, polyimide and the free radical polymerization initiator is 100:300-1000:2.

3. The preparation method according to claim 2, wherein, the organic solvent is N-methylpyrrolidone, tetrahydrofuran or toluene.

4. The preparation method according to claim 3, wherein, the free radical polymerization initiator is benzoyl peroxide, t-butyl peroxybenzoate or methylethyl ketone peroxide.

5. The preparation method according to claim 1, wherein, the reaction is conducted at a temperature of 200-400° C.

6. The preparation method according to claim 1, wherein, the reaction is maintained for 6-24 hours.

7. A polyimide substrate, manufactured by reacting lignin, polyimide, and a free radical polymerization initiator, wherein the polyimide substrate comprises active groups of hydroxyl, carboxyl, and aryl from the lignin such that the polyimide substrate has a maximum absorption peak that redshifts from less than or equal to 280 nm to less than or equal to 380 nm.

8. The polyimide substrate according to claim 7, wherein, a mass ratio of lignin, polyimide and the free radical polymerization initiator is 100:300-1000:2.

9. The polyimide substrate according to claim 7, wherein, the free radical polymerization initiator is benzoyl peroxide, t-butyl peroxybenzoate or methylethyl ketone peroxide.

10. The polyimide substrate according to claim 7, wherein the polyimide substrate has a maximum absorption peak that redshifts from less than or equal to 280 nm to greater than 280 nm.

11. The polyimide substrate according to claim 7, wherein the polyimide substrate has a transmittance above 85%.

12. A flexible display, comprising the polyimide substrate according to claim 7.

13. The flexible display according to claim 12, wherein, a mass ratio of lignin, polyimide and the free radical polymerization initiator is 100:300-1000:2.

14. The flexible display according to claim 12, wherein, the free radical polymerization initiator is benzoyl peroxide, t-butyl peroxybenzoate or methylethyl ketone peroxide.

15. A flexible display, comprising a polyimide substrate prepared by a method comprising the steps of:
dissolving lignin, polyimide, and a free radical polymerization initiator in an organic solvent; and
coating the solution obtained after dissolution on a glass substrate, and obtaining a polyimide substrate by reacting in a nitrogen gas atmosphere,
wherein the polyimide substrate comprises active groups of hydroxyl, carboxyl, and aryl from the lignin such that the polyimide substrate has a maximum absorption peak that redshifts from less than or equal to 280 nm to less than or equal to 380 nm.

16. The flexible display according to claim 15, wherein, a mass ratio of lignin, polyimide and the free radical polymerization initiator is 100:300-1000:2.

17. The flexible display according to claim 16, wherein, the organic solvent is N-methylpyrrolidone, tetrahydrofuran or toluene.

18. The flexible display according to claim 17, wherein, the free radical polymerization initiator is benzoyl peroxide, t-butyl peroxybenzoate or methylethyl ketone peroxide.

19. The flexible display according to claim 15, wherein, the reaction is conducted at a temperature of 200-400° C.

20. The flexible display according to claim 15, wherein, the reaction is maintained for 6-24 hours.

\* \* \* \* \*